US010946548B2

(12) United States Patent
Pol et al.

(10) Patent No.: US 10,946,548 B2
(45) Date of Patent: Mar. 16, 2021

(54) WOOD TREATMENT SYSTEM AND METHOD FOR WOOD TREATMENT

(71) Applicant: TITAN WOOD LIMITED, London (GB)

(72) Inventors: Bernardus Jozef Maria Pol, London (GB); Andreas Jacobus Lelieveld, London (GB)

(73) Assignee: TITAN WOOD LIMITED, London (GB)

( * ) Notice: Subject to any disclaimer, the term of this patent is extended or adjusted under 35 U.S.C. 154(b) by 0 days.

(21) Appl. No.: 15/508,712

(22) PCT Filed: Sep. 4, 2015

(86) PCT No.: PCT/EP2015/070255
§ 371 (c)(1),
(2) Date: Mar. 3, 2017

(87) PCT Pub. No.: WO2016/034713
PCT Pub. Date: Mar. 10, 2016

(65) Prior Publication Data
US 2017/0266836 A1   Sep. 21, 2017

(30) Foreign Application Priority Data

Sep. 5, 2014   (EP) .................................... 14183821

(51) Int. Cl.
*B27K 3/02*   (2006.01)
*B05C 3/09*   (2006.01)
(Continued)

(52) U.S. Cl.
CPC ................. *B27K 3/02* (2013.01); *B05C 3/09* (2013.01); *B05C 13/02* (2013.01); *B27K 3/10* (2013.01);
(Continued)

(58) Field of Classification Search
None
See application file for complete search history.

(56) References Cited

U.S. PATENT DOCUMENTS

| | | | | |
|---|---|---|---|---|
| 1,212,583 A | * | 1/1917 | Tanner | F26B 7/00 105/160.5 |
| 1,643,174 A | * | 9/1927 | Rice | B27K 3/10 118/50 |
| 1,693,395 A | * | 11/1928 | Lawton | F26B 9/04 24/17 R |

(Continued)

FOREIGN PATENT DOCUMENTS

| | | |
|---|---|---|
| GB | 1470719 A | 4/1977 |
| WO | 2009040656 A2 | 4/2009 |
| WO | 2013101651 A1 | 7/2013 |

OTHER PUBLICATIONS

International Search Report & Written Opinion dated Nov. 30, 2015 from corresponding International PCT Application No. PCT/EP2015/070255, 8 pages.

*Primary Examiner* — Binu Thomas
(74) *Attorney, Agent, or Firm* — Innovation Capital Law Group, LLP; Vic Lin

(57) ABSTRACT

A system for treating wood (30), comprising: —a treatment vessel (14) configured to receive at least one wood stack (4) for treatment, and —a stack holding system (2) for holding a wood stack (4), the stack holding system (2) comprising: —a frame (6), configured to support the wood stack (4); —a first element (8), connected to the frame (6) near an upper side of said frame (6), configured to exert a first, downward force on the wood stack (4); and —a second element (10), connected to the frame (6) near a lower side of said frame (6), configured to exert a second force on the wood stack (4) in a direction opposite said first force. The invention also comprises a method for treating wood, using a system for treating wood according to the invention.

12 Claims, 9 Drawing Sheets

(51) Int. Cl.
  *B05C 13/02* (2006.01)
  *B27K 3/10* (2006.01)
  *B65G 1/14* (2006.01)
  *B27K 3/34* (2006.01)
(52) U.S. Cl.
  CPC ............... *B27K 3/346* (2013.01); *B65G 1/14* (2013.01); *B65G 2201/022* (2013.01); *B65G 2201/0282* (2013.01)

(56) References Cited

U.S. PATENT DOCUMENTS

| | | | | |
|---|---|---|---|---|
| 1,713,689 A * | 5/1929 | Colman | ................... | B27K 3/10 105/365 |
| 2,578,039 A * | 12/1951 | Bonnell | ................... | B27K 3/10 118/50 |
| 3,986,268 A * | 10/1976 | Koppelman | .............. | F26B 3/34 34/257 |
| 4,156,043 A * | 5/1979 | France | ................... | B27K 3/10 427/297 |
| 4,188,878 A * | 2/1980 | Kuhnau | ................... | B25B 11/00 100/212 |
| 4,343,840 A * | 8/1982 | Edwards | ................... | B27K 3/08 118/50 |
| 4,472,618 A * | 9/1984 | Cloer | ................... | F26B 3/347 219/775 |
| 4,542,046 A * | 9/1985 | Moldrup | ................... | B27K 3/10 118/50 |
| 5,072,692 A * | 12/1991 | Ikeda | ................... | B27K 3/08 118/400 |
| 5,240,236 A * | 8/1993 | Mierau | ................... | B27L 11/002 269/131 |
| 2005/0223590 A1* | 10/2005 | Erickson | ................... | F26B 7/00 34/518 |
| 2011/0212273 A1* | 9/2011 | Holm | ................... | B27K 3/08 427/532 |
| 2013/0172526 A1* | 7/2013 | Carvajal | ................... | B27K 3/02 414/222.01 |

* cited by examiner

WOOD TREATMENT SYSTEM AND METHOD FOR WOOD TREATMENT

CROSS-REFERENCE TO RELATED APPLICATIONS

This application is a National Stage Entry of PCT/EP2015/070255, filed Sep. 4, 2015.

FIELD OF THE INVENTION

The invention relates to a wood treatment system comprising an improved stack holding system. The invention also relates to a method for treating wood using an improved stack holding system.

BACKGROUND OF THE INVENTION

Wood is used in a wide variety of products, such as buildings, fences and furniture. Although wood is renewable and relatively cheap, it is also susceptible to decay, especially when used outdoors and/or in humid environments. In order to protect against decay and increase the longevity of the products, most wood is prior to its use subjected to a preservation treatment using a wood treatment system.

A variety of wood treatment processes exists, with pressure-based treatment processes being used most often. A pressure-based process, such as for example a full-cell pressure or Bethel process, requires a treatment system comprising a treatment vessel, in which a bundle or stack of wood can be introduced. A bundle or stack may be comprised of a plurality of wooden beams, pieces or boards that are stacked or placed in an organised manner. In addition, the bundle or stack may also contain other suitable wood-based products.

During the treatment, the treatment vessel is filled with a treatment fluid, often comprising an impregnation fluid. Subsequently, the treatment vessel is pressurized to force the impregnation fluid into the wood. A disadvantage of this system is that the wood will start to float during the filling of the treatment vessel due to its natural buoyancy. The buoyancy allows free movement of the wood through the treatment vessel, allowing the wood stack or bundle to disorganise into separate elements of the stack or bundle. The elements may cause collisions between the wood elements themselves as well as between the wood and the treatment vessel. Such collisions may in turn result in damaged wood and/or damage to the treatment vessel. Also, discharging the wood from the treatment vessel may become time-consuming and troublesome.

In order to prevent such floating, WO2013/101651 discloses a system for treating wood having a bundle or stack stabilization system. More specifically, WO'651 discloses a system for treating wood comprising a chemical treatment vessel for receiving at least one bundle of wood and a bundle stabilization system for securing the bundle of wood within the interior of the chemical treatment vessel. The bundle stabilization system comprises at least one bundle hold-down device located within in the upper one-half of the internal volume of the chemical treatment vessel. The bundle hold-down device is physically coupled to at least one wall of the chemical treatment vessel and is configured to contact at least a portion of the upper surface of the bundle of wood during the treatment of the bundle of wood within the wood treatment vessel.

A disadvantage of the system disclosed in WO'651 is that a physical coupling between the bundle or stack hold-down device and the wall of the treatment vessel exists, which extends through the treatment vessel wall. Such an extension is undesirable, since it introduces the risk of chemical fluid leaking from the treatment vessel through the coupling into the environment around the treatment vessel. This would incur both environmental and health related risks. In addition, the disclosed hold-down device can not easily be retrofitted into existing wood treatment systems.

SUMMARY OF THE INVENTION

The object of the invention is to provide an improved wood bundle or stack holding system that retains the advantages of the prior art, while reducing the disadvantages. To that end, the invention provides a system for treating wood 30, comprising:
 a treatment vessel 14 configured to receive at least one wood stack 4 for treatment, and
 a stack holding system 2 for holding a wood stack 4, the stack holding system 2 comprising:
  a frame 6, configured to support the wood stack 4;
  a first element 8, connected to the frame 6 near an upper side of said frame 6, configured to exert a first, downward force on the wood stack 4; and
  a second element 10, connected to the frame 6 near a lower side of said frame 6, configured to exert a second force on the wood stack 4 in a direction opposite said first force.

The system described in the invention has several advantages over the prior art. First of all, the stack holding system described in the invention does not have a physical coupling with the treatment vessel wall that extends through the wall of the treatment vessel. The absence of a coupling extending through the wall is advantageous, since the risk of chemical fluid leaking through the coupling into the environment is removed. As a result, the invention will reduce the risk of environmental and/or health damage due to chemical fluid leakage. Furthermore, the absence of a physical coupling that extends through the treatment vessel wall, means that the stack holding system from the invention may be used in multiple treatment vessels. Moreover, retrofitting existing treatment vessels with the stack holding system described in the invention may require none or only minor adaptations to the treatment vessel.

Also, the stack holding system is designed to hold together the wood stack even while allowing a (limited) amount of floating of the wood stack. In addition, the system for treating wood might be used for a variety of treatment processes, such as impregnation with fire-retardants, biocides, preservatives etc.

The invention also comprises a method for treating wood, the method comprising the following steps:
 providing a system for treating wood 30 according to any one of the preceding claims,
 introducing the stack holding system 2 holding the wood stack 4 into the treatment vessel 14,
 treating the wood stack 4 using a wood treatment process, the process involving the at least partial immersion of the holding system 2 in a fluid,
 removing the holding system 2 holding the treated wood stack 4 from the treatment vessel 14.

The method for treating wood involving the system for treating wood is advantageous over the methods used in the prior art, most notably the (chemical) impregnation of wood using the system disclosed in WO'651. First of all, the stack holding system can be loaded with a wood stack before the stack holding system is introduced into the treatment vessel.

This allows a more efficient wood treatment process, since the ensuing wood stacks can be prepared in advance, thus reducing the time that the treatment vessel is idle. Furthermore, the method using the wood treatment system of the invention reduces the risk of chemicals leaking from the reactor, since there is no physical coupling with the treatment vessel wall that extends through the wall of the treatment vessel. Also, the absence of such a physical coupling reduces the risk of leakage of air/oxygen into the treatment vessel when at the air pressure inside the treatment vessel is lower than the atmospheric pressure.

The various embodiments of the invention will be further elucidated with reference to some examples shown in the figures. The embodiments may be combined or may be applied separate from each other.

DETAILED DESCRIPTION

Figure 1:
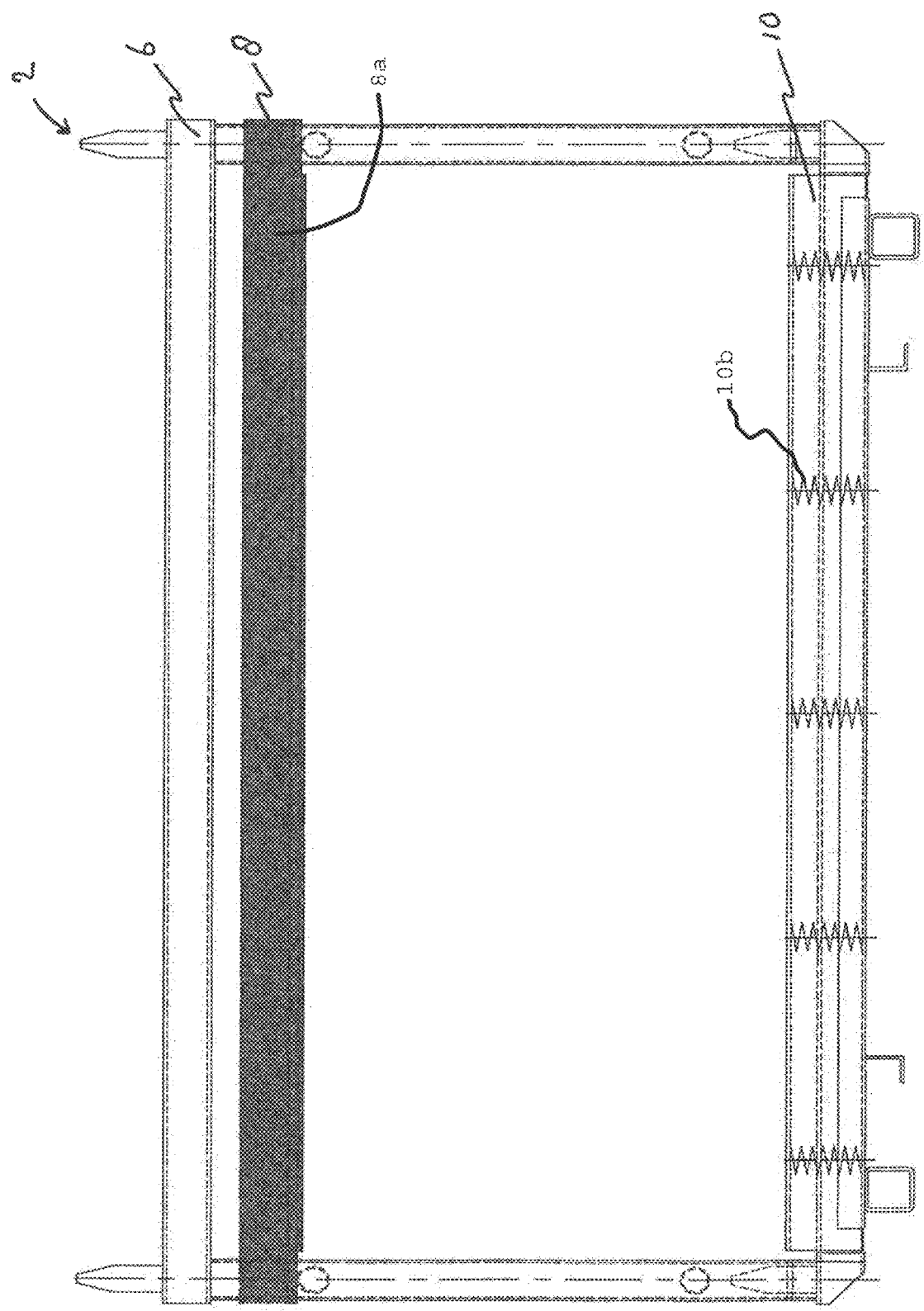
FIG. 1 is a schematic front view of a stack holding system, which is part of the system for treating wood according to the invention.

In this application similar or corresponding features are denoted by similar or corresponding reference signs. The description of the various embodiments is not limited to the examples shown in the figures and the reference number used in the detailed description and the claims are not intended to limit what is described in the examples shown in the figures. The invention comprises a A system for treating wood (30), comprising:
  a treatment vessel (14) configured to receive at least one wood stack (4) for treatment, and
  a stack holding system (2) for holding a wood stack (4), the stack holding system (2) comprising:
    a frame (6), configured to support the wood stack (4);
    a first element (8), connected to the frame (6) near an upper side of said frame (6), configured to exert a first, downward force on the wood stack (4); and
    a second element (10), connected to the frame (6) near a lower side of said frame (6), configured to exert a second force on the wood stack (4) in a direction opposite said first force.

The system for treating wood according to the invention may be used in various processes for wood treatment. This may include full-cell and empty-cell wood treatment pressure processes, but may also include fluctuation or dipping or submerging wood treatment processes. Typically, the system for treating wood comprises a treatment vessel having at least one fluid intake to introduce a fluid into the treatment vessel.

The system for treating wood provided in the invention has several advantages over the prior art. One advantage of the system for treating wood is that the stack holding system is not an integral part of a treatment vessel. This first of all means that the stack holding system can be used in multiple treatment vessels, which is economically attractive. Moreover, the stack holding system can also be used in existing treatment vessels. This requires only minor adaptations of the existing treatment vessels, or, in some case, no adaptations at all. Another advantage of the stack holding system over the prior art is that it does not have a physical coupling with the treatment vessel wall that extends through the wall of the treatment vessel. The absence of such a coupling significantly reduces the risk of chemicals leaking out of the treatment vessel into the environment and reduces the risk of leakage of air/oxygen into the treatment vessel when at the air pressure inside the treatment vessel is lower than the atmospheric pressure.

According to an embodiment of the invention the first element 8, the second element 10 or both may be configured to exert an adaptable force on said wood stack 4, wherein the first element (8), the second element (10) or both preferably comprise one or more compression springs (10b).

It is beneficial to allow one or both of the elements 8 and 10 to exert an adaptable force on the wood stack 4. During the at least partial immersion of the holding system 2, the wood stack 4 exerts an upward force on the holding system 2 due to buoyancy of the wood. The force exerted by the first element 8 and second element 10 may than be adapted to compensate for the buoyancy forces, while still maintaining the clamping force needed to hold together the wood stack 4. Furthermore, when using one or both elements providing an adaptable force, the stack holding system may also be used to hold fragile of breakable items. This may for example comprise (thin) wooden boards or beams.

Preferably, the first element 8, the second element 10 or both comprise one or more compression springs. The first element 8 may comprise one or more compression springs configured to exert an adaptable substantially downwardly directed force on an upper side of the wood stack 4. Using compression springs for the first element 8 is advantageous, since they provide an increasing (downwardly directed) force on the wood stack 4 with an increasing upward force derived from buoyancy of the wood stack 4. As such, the force exerted by the compression springs adapt to the (increasing) upward force exerted by the wood stack 4 on the first element 8 during the at least partial immersion of the holding system 2. The compressions springs may adapt to and partially counteract the (increasing) upward force by exerting an increased substantially downward force. Also, the second element 10 may comprise one or more compression springs configured to exert an adaptable substantially upwardly directed force on a lower end side of the wood stack 4. This provides several advantages. First of all, compression springs are configured to provide a force that adapts in reaction to the force exerted on the spring. Thus, even as the wood stack 4 may start floating during the at least partial immersion of the holding system 2, the second element 10 comprising compression springs will continue to provide a substantially upwardly directed force on the wood stack 4. The upwardly directed force exerted by the compression springs in the second element 10 depends on the downwardly exerted force of the wood stack 4. Furthermore, as the wood stack 4 may start floating, the second element 10 needs to be contiguous to the wood stack 4 in order to hold the wood stack 4 together. Using compression springs is advantageous as they will extend as the wood stack 4 may start to float, thus ensuring that the second element 10 remains contiguous to the lower end side of the wood stack 4.

According to an embodiment of the invention, the first element 8, the second element 10 or both elements may be slidably connected to the frame 6. First of all, the clamping function of the holding system may be guaranteed using at least one slidable element. Even if the wood stack may start floating during filling of the treatment vessel with a fluid, the slidable element may move along with the wood stack and may still exert a clamping force on the wood stack to hold it together. In addition, if one or both elements is slidably connected to the frame, the holding system may be used to hold various sizes of wood stacks by moving the elements either towards each other with smaller stacks or away from each other with larger stacks.

Figure 2:
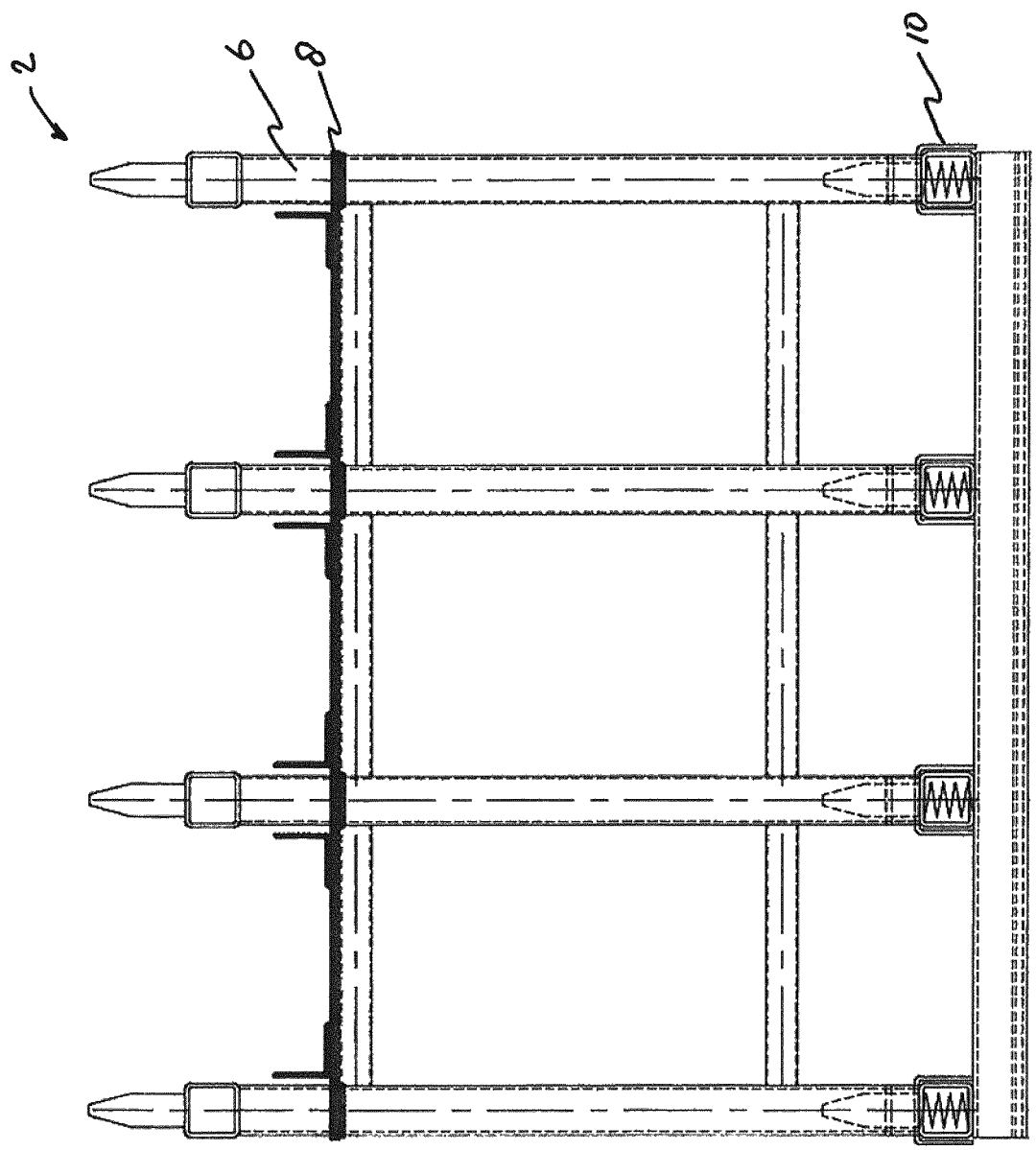
FIG. 2 is a schematic side view of the stack holding system of FIG. 1.
Figure 3:
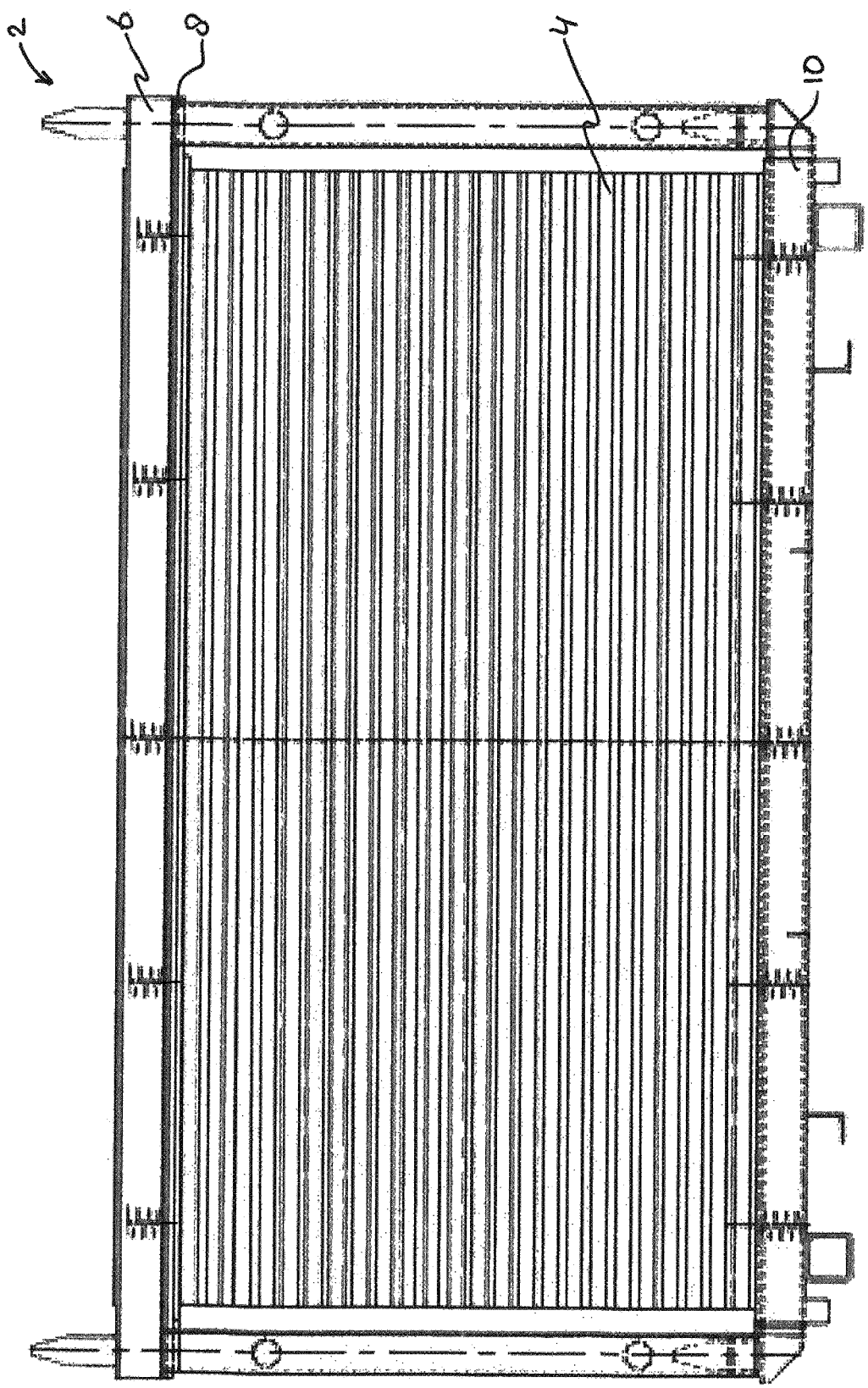
FIG. 3 is a schematic front view of the stack holding system of FIG. 1, now enclosing a wood stack.

FIGS. 1-3 depict an example of a stack holding system according to the invention. The front view and side view of the stack holding system, depicted in FIGS. 1 and 2 respectively, clearly show a frame 6 of a stack holding system 2. A wood stack 4 (shown in FIG. 3) may be held in the frame 6. Also clearly visible are a first element 8, slidably connected near the upper part of the frame 6, and a second element 10, which is slidably connected near the lower side of the frame 6. FIG. 3 shows the holding system of FIG. 1, enclosing a wood stack 4. Clearly visible is that both the first element 8 as well as the second element 10 are contiguous to the wood stack 4. The first element 8 comprises a weight 8a and exerts a downward force on the wood stack 4, whereas the second element 10 exerts an upward force on the wood stack 4, both forces cooperating to hold together the wood stack 4. FIG. 3 also shows that the force exerted by the second element 10 is configured such that the wood stack 4 is contiguous to the wood stack. The force exerted by the second element 10 is however not sufficient to lift the wood stack 4 upwards in the frame 6 when the holding system 2 is not at least partially immersed in a fluid.

According to an embodiment of the invention, the stack holding system 2 comprises an anchoring means 12 for anchoring the holding system 2 to a treatment vessel 14. The anchoring means 12 is operable to substantially prevent floating of the holding system 2 while the holding system 2 is at least partially immersed in a fluid.

Providing an anchoring means 12 to the holding system 2 is advantageous. The holding system 2 may be configured to hold the wood stack 4 together during the floating, but the holding system 2 itself may start to float under influence of the buoyancy forces acting on the wood stack 4 during at least partial immersion of the holding system 2. An anchoring means 12 connected to the holding system 2 may limit such floating. The anchoring means 12 might be any suitable anchoring means such as for example a chain, cable or a connecting element. The holding system 2 and the treatment vessel 14 may for example be anchored using the anchoring means 12 prior to the start of the process. In addition, the anchoring means 12 may be configured such that no additional actions are required to make the anchoring means operable.

According to an elaboration of the embodiment of the invention, the anchoring means 12 comprises a frame angle section 16, connected to the frame 6, and a treatment vessel angle section 18, connected to the treatment vessel 14, wherein the frame angle section 16 is in contact with the treatment vessel angle section 18 such that the frame angle section 16 and the treatment vessel angle section 18 cooperate to limit floating of the holding system 2 during at least partial immersion of the stack holding system 2.

The advantage of this embodiment is that the anchoring takes place automatically. The frame angle sections slide underneath the treatment vessel angle sections during loading of the holding system 2 into the treatment vessel 14. The holding system 2 may start to float due to partial immersion of the holding system 2 in a fluid, which causes the frame angle section to float against the treatment vessel angle section, with both sections cooperating to limit the floating of the holding system 2. Thus, no additional operations are required to anchor the holding system 2 to the treatment vessel 14.

Figure 4:
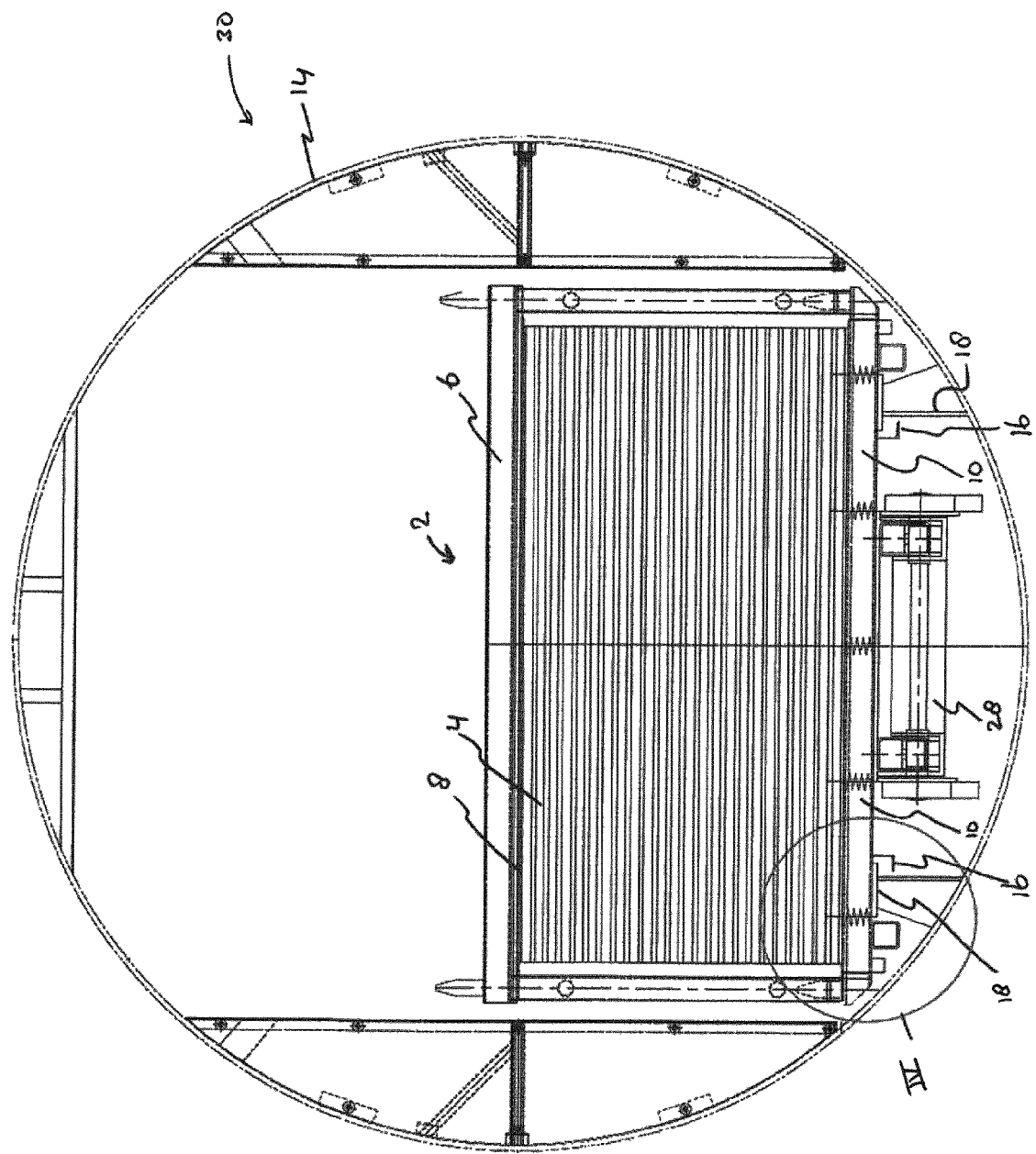
FIG. 4 is a vertical cross-section of the system for treating wood, comprising a treatment vessel enclosing the stack holding system of FIG. 3.
Figure 5B:
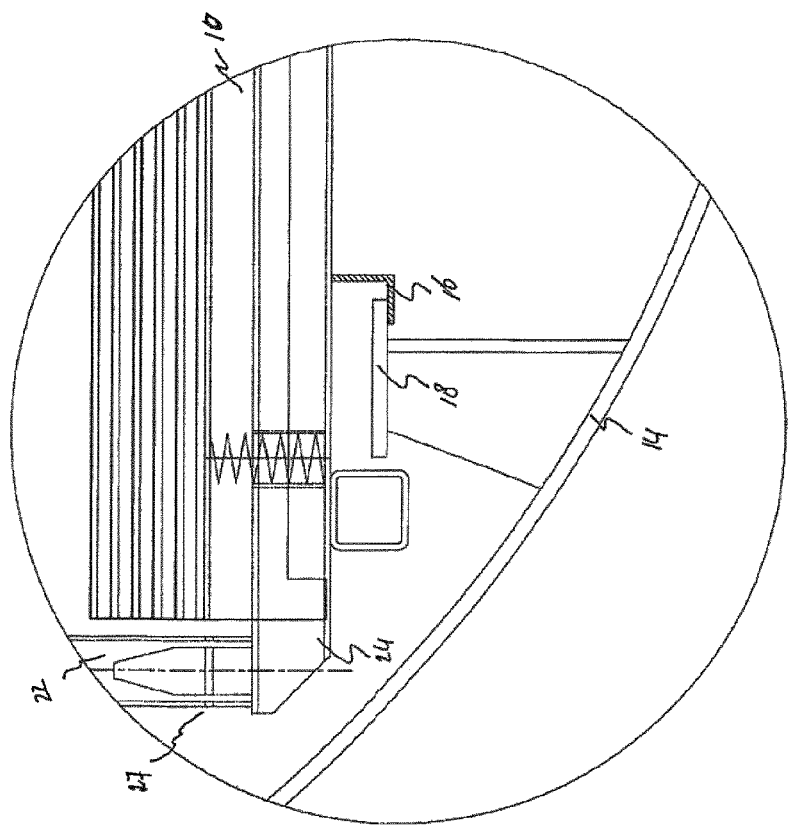
FIG. 5b shows an enlarged view of a part IV of FIG. 4, with the holding system at least partially immersed and floating.
Figure 5A:
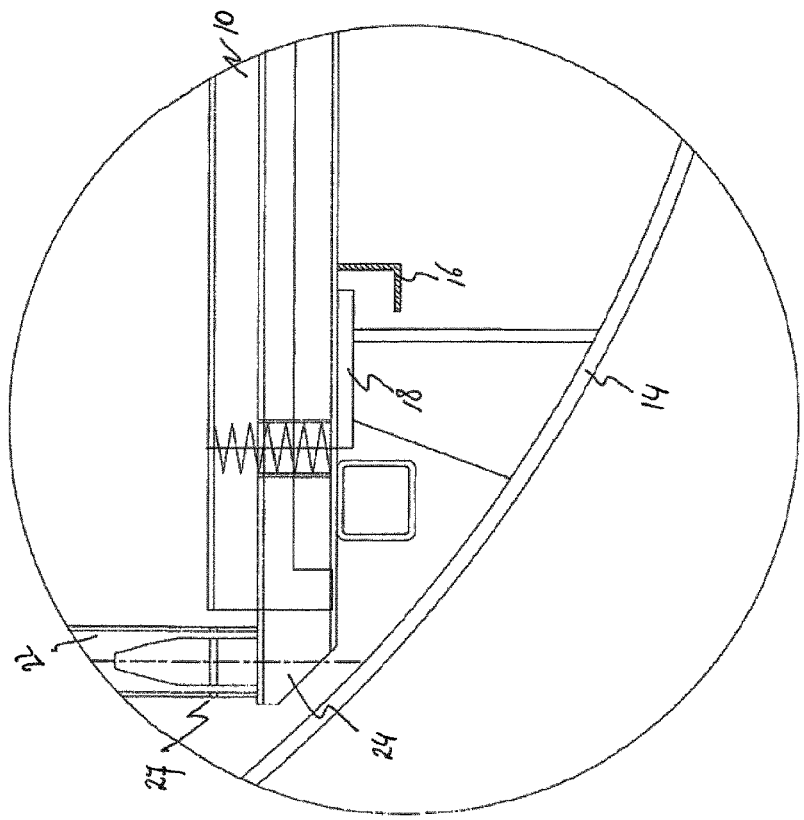
FIG. 5a shows an enlarged view of a part IV of FIG. 4.

FIG. 4 shows an example of the system for treating wood according to the invention, comprising a treatment vessel 14 and the holding system 2 of FIG. 3. The holding system 2 is introduced in the treatment vessel 14. Clearly shown are two anchoring means 12, provided on a lower end side of the holding system 2. The anchoring means 12 may be comprised of a treatment vessel angle section 18 and a frame angle section 16. FIG. 5a shows an enlarged view of a part IV of FIG. 4, showing in more detail the frame angle section 16 and the treatment vessel angle section 18. FIG. 5b shows an enlarged view of a part IV of FIG. 4, with the holding system at least partially immersed and floating. If the holding system 2 may start to float during at least partial immersion of the holding system 2 in a fluid, the horizontally oriented part of the frame angle section 16 will move upwards until it comes in contact with the horizontally oriented part of the treatment vessel angle section 18, thus limiting the floating of the holding system 2.

In an embodiment of the invention, the first element 8 is configured to exert a substantially downwardly directed force on the wood stack 4 to reduce floating of said wood stack 4 during at least partial immersion of the holding system 2 in a fluid. The second element 10 is configured to simultaneously be contiguous to the wood stack 4 during the at least partial immersion of the holding system 2. In this embodiment the first element 8 and the second element 10 work together to hold together the wood stack 4 during at least partial immersion of the holding system 2 (and the wood stack 4). The first element 8 is configured to exert a net downward force on the wood stack 4 to reduce floating, which is beneficial to the treatment process. A reduction in floating of the wood stack results in a larger part of the wood stack being immersed in the fluid during filling, which may be beneficial for the duration of the treatment process. First of all, a larger part of the wood stack may start to absorb impregnation fluid. Also, the wood loses buoyancy due to absorption of impregnation fluid, which means the amount of floating of the wood stack will be reduced with a larger part of the wood stack being immersed. In addition, the second element 10 may be contiguous to the wood stack 4 during the partial immersion of the holding system 2 and, thus, the wood stack 4. This means the second element 10 needs to extend or stretch upwards from its connection to the frame to the lower end surface of the wood stack 4. Reduction of floating also reduces the extension distance of the second element 10. Thus, the second element 10 can be lighter and less material is needed for manufacturing it. If the second element 10 comprises one or more compression springs, the compression springs may have to be less powerful with a reduction of the floating. This is economically beneficial.

In an embodiment of the invention, the first element 8 comprises a weight configured to exert a substantially downwardly directed force on an upper side of the wood stack 4. In an elaboration of the embodiment, the weight is made of concrete, metal or an alloy, for example stainless steel. The use of weights to exert a downward force on a wood stack has several advantages. First of all, the use of a weight to exert a downward force on a wood stack 4 is well-known in the art. Weights of concrete, metal or alloys are readily available and may be easily integrated into the holding system 2. However, weights made of other materials or alloys suitable for exerting a downward force may be used as well. Secondly, applying weights is a relatively cheap and durable solution to exert a force on the wood stack. In some embodiments, the first element (8) may comprise one or more compression springs together with a weight configured to exert a substantially downwardly directed force on an upper side of the wood stack (4).

According to another embodiment of the invention, the holding system 2 is stackable. A stackable holding system has several advantages. First of all, several holding systems might be stacked in order to fill larger treatment vessels, which is economically attractive. Furthermore, the holding systems, being stackable, may also be used for storing wood stacks before and after the wood treatment. As such, a more efficient logistic process may be realised. Also, a stackable system may be used to treat wood stacks of different kinds of wood in a single treatment. Each wood stack may be stacked in a single holding system, and subsequently the holding systems may be stacked.

In an embodiment of the invention, the frame 6 comprises an upper frame element 22 and a lower frame element 24, which may be locked with at least one locking element 26 (not shown). This feature may allow for easier loading of a wood stack on the holding system. During loading, the upper part of the holding system may be removed, thus allowing easy access for loading a wood stack. After having loaded the wood stack, the upper frame part can be connected with the lower frame part. Both elements are locked using a locking element 26, such as for example a bolt, a nut or a locking pin.

Figure 6:
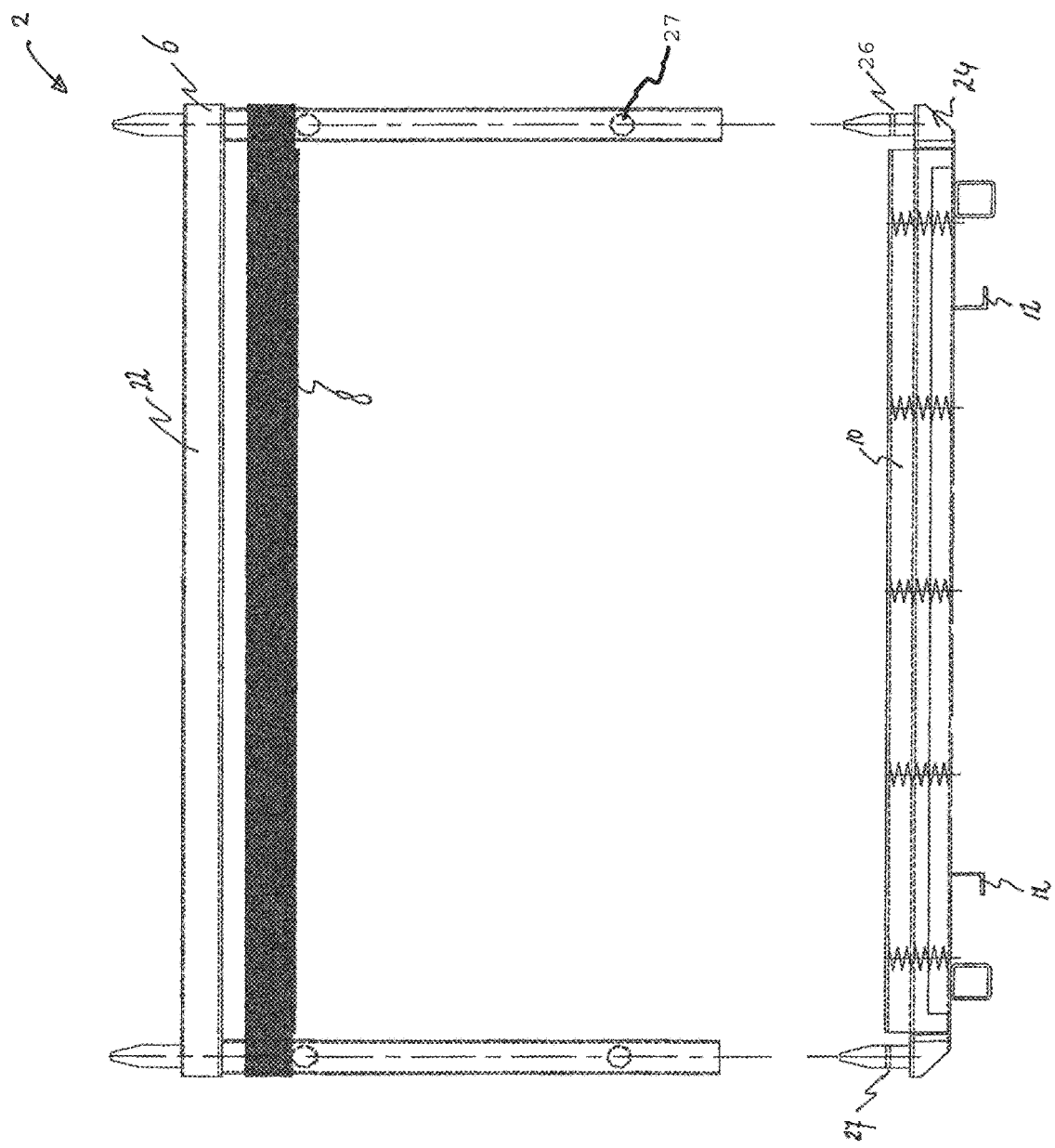
FIG. 6 shows a schematic front view of a holding system with an upper and a lower frame element.
Figure 7:
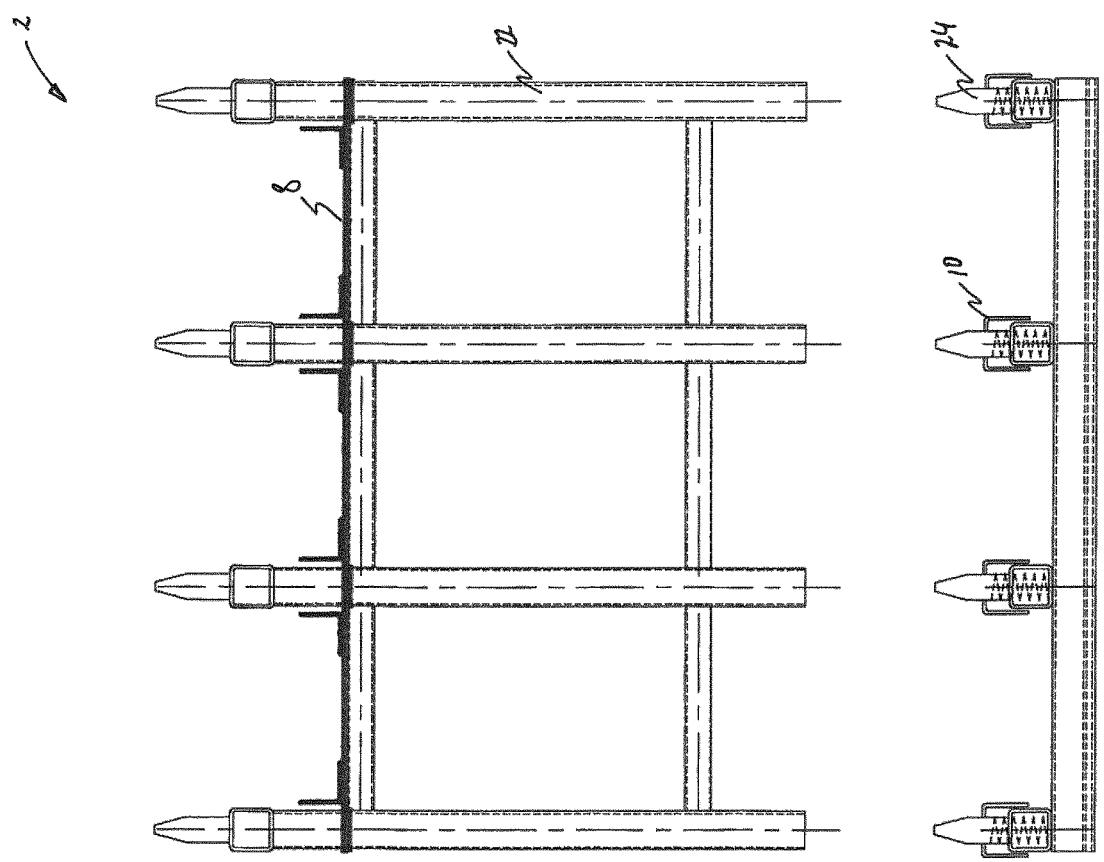
FIG. 7 shows a schematic side view of the stack holding system of FIG. 6.

FIGS. 6 and 7 depict an example of respectively a front view and a side view of a holding system with an upper and a lower frame element. The upper frame element 22 may be provided with hollow beams that may be slid over the extending parts on the sides of the lower frame 24, which are located next to the second element 10. Both the beams of the upper frame element 22 and the extending parts on the lower frame element 24 are provided with a hole 27 together providing a locking element 26. The hole 27 may be cylindrical, but may also comprise any other suitable form.

According to an aspect of the invention, the system comprises at least one transport cart (28) configured to transport the holding system (2) from and into the treatment vessel (14). The holding system 2 may be adapted to be transported on a transport cart 28. This may provide several benefits. First of all, the use of transport carts 28 may provide a more efficient production process, due to improved logistics. Bringing the holding system 2 into and out of the treatment vessel 14 can be expedited using transport carts 28. In addition, the transport cart 28 can be used as integral part of the total logistics in the production process, which allows the wood stack 4 to remain on a single transport means during the total treatment process.

FIG. 4 shows the stack holding system 2 on a transport cart 28, both located inside the treatment vessel 14. The transport cart 28 is configured to hold the holding system 2 and wood stack 4 such that they may be introduced without colliding with the treatment vessel angle section 18. This may for example advantageously be done using a transport cart 28 that is adjustable in height.

According to an embodiment of the invention, the system for treating wood comprises a frame 6 configured to support at least a second wood stack 34. The second wood stack 34 is supported by the side of the frame 6 opposite the side of the frame 6 that supports the first wood stack 4. It may be economically beneficial to have two wood stacks that may be carried by a single frame. An advantage of this embodiment is that it provides an improved treatment capacity. It may for example allow a smaller wood stack to be placed on top of the frame 6. Also, a wood stack comprised of smaller wood or a smaller wood stack may be placed in the holding system, whereas a larger stack of a stack of larger wood may be placed on top. This is possible due to the fact that the holding system 2 supports the wood stacks.

According to an elaboration of the invention, the system for treating wood 30 comprises a third element 36. The third element is positioned on the side of the second wood stack 34 that is opposite the side of the second wood stack 34 supported by the frame 6. The third element 36 is configured to exert a force in the direction of the frame 6. This elaboration is beneficial for holding in place the second wood stack 34 that is placed on top of the frame 6 of the holding system 2. The third element 36 prevents disorganisation (and subsequent floating) of the second wood stack.

Figure 8:
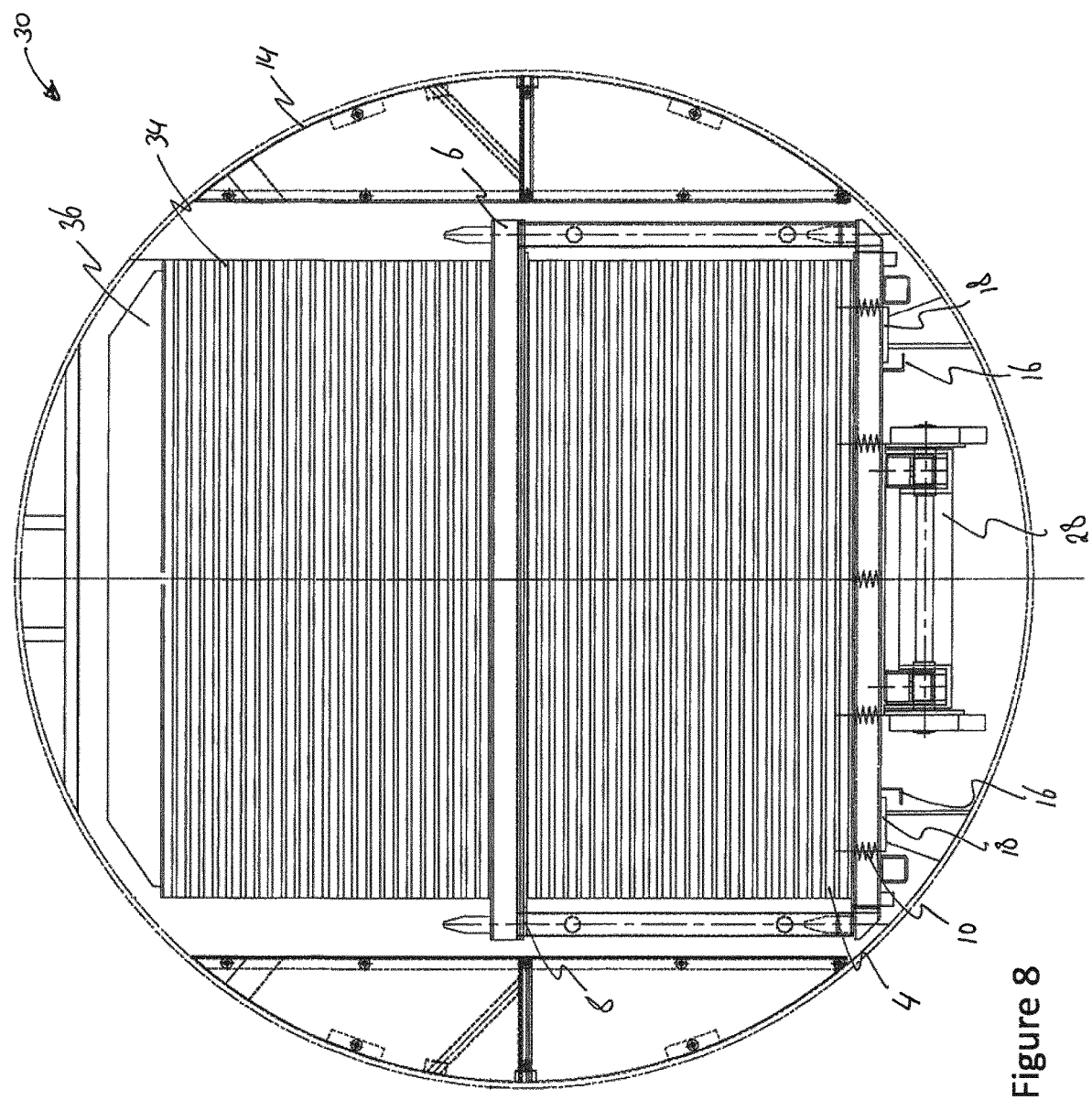
FIG. 8 shows a vertical cross-section of a system for treating wood, comprising a treatment vessel and a holding system holding two wood stacks.

FIG. 8 shows a vertical cross-section of a system for treating wood, comprising a treatment vessel and a holding system. It is clearly visible that the frame 6 of the holding system 2 is configured to carry two wood stacks 4, 34. The first wood stack 4 is held in the frame 6 of the holding system 2, whereas the second wood stack 34 is placed on top of the frame 6. The second wood stack 34 is held in place by a third element 36, which exerts a downwardly directed force on the second wood stack 34. The third element 36 is shaped such that it matches the curvature of the upper side of the treatment vessel.

The invention also comprises a method for treating wood, the method comprising the following steps:
  providing a system for treating wood (30) according to any one of the preceding claims,
  introducing the stack holding system (2) holding at least one wood stack (4) into the treatment vessel (14),
  treating the wood stack (4) using a wood treatment process, the process involving the at least partial immersion of the holding system (2) in a fluid,
  removing the holding system (2) holding the treated wood stack (4) from the treatment vessel (14), The method for treating wood involving the stack holding system is advantageous over the methods used in the prior art, most notably the (chemical) impregnation of wood using the system disclosed in WO'651. First of all, the stack holding system can be loaded with a wood stack before the stack holding system is introduced into the treatment vessel. This allows a more efficient wood treatment process, since the ensuing wood stacks can be prepared in advance, thus reducing the time that the treatment vessel is idle. The method may comprise any suitable wood treatment process. The treatment of the wood stack with a wood treatment process may for example comprise applying a vacuum to the treatment vessel 14 prior to the introduction of a treatment fluid. A vacuum may be applied to the treatment vessel to extract air from both the treatment vessel and the wood stack. This may be advantageous, since the extraction of air from the wood stack may allow a deeper penetration of the treatment fluid in the wood stack. This may increase the effectiveness of the wood treatment. Also, the method steps comprising introducing the wood stack 4 in the treatment vessel 14 and/or removing the wood stack 4 from the treatment vessel 14, may be comprised of having the introduction and/or removal is executed using transport carts 28 configured to transport the holding system 2. The method for treating wood may be optimised using transport carts for at least part of the logistic process. This may for example concern the introduction and removal of the holding system into and from the treatment vessel. This is economically beneficial, because the wood stack may be prepared outside the treatment vessel, thus ensuring that the treatment vessel can be optimally used to carry out the method. In addition, the treatment step of the method may also comprise for example a pressurisation step, during which the pressure in the treatment vessel may be increased above ambient pressure, thus forcing treatment fluid into the wood. The pressurisation may be maintained for a predetermined time, for example up to the point that the wood ceases to absorb any impregnation fluid or for a set period of time. The treatment step may further also comprise reducing the pressure in the treatment vessel to ambient air pressure, while simultaneously draining the treatment fluid from the treatment vessel.

In another embodiment of the invention, the method also comprises anchoring the holding system 2 to the treatment vessel 14 to substantially prevent floating of the holding system 2 during the at least partial immersion of the wood stack 4 in the fluid in the treatment vessel 14.

According to a further embodiment of the invention, the method comprises the first element 8 exerting a downwardly directed force on the wood stack 4 to reduce floating of said wood stack 4 during the at least partial immersion of the wood stack 4. Simultaneously the second element 10 exerts an upwardly directed force on the wood stack 4 adequate to keep said second element 10 in contact with the wood stack 4 during floating of the wood stack 4.

In an even further embodiment of the invention, the method comprises the acetylation of wood. This method step may comprise any process used to impregnate wood for the subsequent acetylation of wood, such as for example a Bethel-process, a Rüping process or a Lowry process or combinations of these. The acytelation process is preferably performed using an acetic anhydride.

In an embodiment of the invention, the method further comprises introducing a second wood stack 34, wherein said second wood stack 34 is positioned on a side of the frame 6 opposite to the side of the frame 6 that supports the at least one wood stack 4.

In an elaboration of the invention, the method comprises introducing a third element 36, positioned on the side of the second wood stack 34 that is opposite the side of the second wood stack 34 supported by the frame 6, wherein the third element 36 exerts a force in the direction of the frame 6.

The method may comprise loading a second wood stack and, subsequently, a third element on the holding system to increase the amount of wood being impregnated using the method for treating wood. It may also increase the economic efficiency of the method, requiring less process time to impregnate a larger amount of wood. Additionally, the second wood stack may be comprised of a different size or species of wood, using the method to treat wood stacks of multiple sizes and/or species simultaneously.

Figure 9:
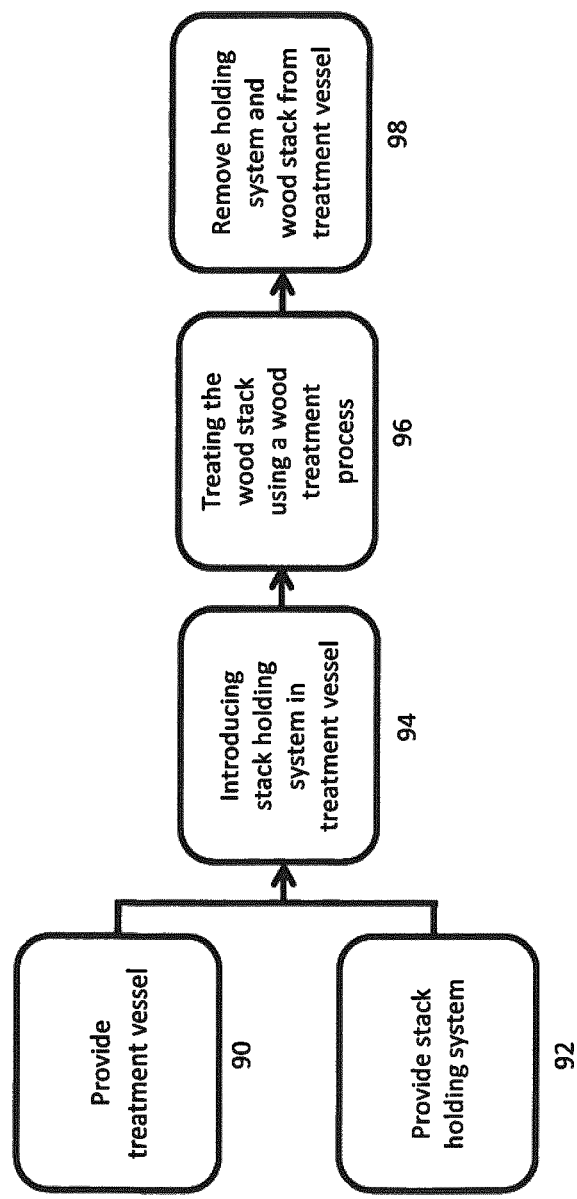
FIG. 9 provides a schematic overview of an embodiment of a method for treating wood according to the invention

FIG. 9 provides a schematic overview of an embodiment of a method for treating wood according to the invention. A first step in the method comprises providing a system for treating wood according to the invention, which comprises providing a treatment vessel, depicted as 90, and a holding system, depicted as 92. The treatment vessel may be configured to contain one or multiple holding systems, each holding system containing at least one wood stack. The holding systems may be configured to be placed on top of each other, next to each other or in rows behind each other or any combination thereof. Each holding system may than be provided with a wood stack and introduced in the treatment vessel (depicted as step 94). After introducing the holding system holding the wood stack, in a subsequent step 96, the wood stack of wood stacks are treated using a wood treatment process. After completion of the treatment, the stack holding system of systems are removed from the treatment vessel (depicted with 98).

The invention claimed is:

1. A system for treating wood (30), comprising:
   (a) a treatment vessel (14) configured to receive at least one wood stack (4) for treatment and a treatment fluid, and further configured to immerse at least partially said at least one wood stack in said treatment fluid, and
   (b) a stack holding system (2) for holding the at least one wood stack (4), the stack holding system (2) comprising:
      a frame (6), configured to support the at least one wood stack (4);
      a first element (8), connected to the frame (6) near an upper side of said frame (6), configured to exert a first, downward force on the at least one wood stack (4); and
      a second element (10), connected to the frame (6) near a lower side of said frame (6), configured to exert a second force on the at least one wood stack (4) in a direction opposite said first force, wherein
   the first element (8), the second element (10) or both are configured to exert an adaptable force on said at least one wood stack (4), and
   the first element includes one or more compression springs configured to exert an adaptable substantially downwardly directed force on an upper side of the at least one wood stack.

2. A system according to claim 1, wherein the first element (8), the second element (10) or both elements are slidably connected to the frame (6).

3. A system according to claim 1, comprising an anchoring elements (12) for anchoring the stack holding system (2) to the treatment vessel (14), wherein said anchoring means (12) is operable to prevent floating of the stack holding system (2) while the stack holding system (2) is at least partially immersed in the treatment fluid.

4. A system according to claim 3, wherein the anchoring means (12) comprises a frame angle section (16) connected to the frame (6) and a treatment vessel angle section (18) connected to the treatment vessel (14), wherein the frame angle section (16) is in contact with the treatment vessel angle section (18) such that the frame angle section (16) and the treatment vessel angle section (18) cooperate to limit floating of the stack holding system (2) during at least partial immersion of the stack holding system (2).

5. A system according to claim 1, wherein the first element (8) is configured to exert the downwardly directed force on the at least one wood stack (4) to reduce floating of said at least one wood stack (4) during at least partial immersion of the stack holding system (2) in the treatment fluid, and wherein the second element (10) is configured to be contiguous to the at least one wood stack (4) during the at least partial immersion of the at least one wood stack holding system (2).

6. A system according to claim 1, wherein the first element (8) further comprises a weight configured to exert a downwardly directed force on an upper side of the at least one wood stack (4).

7. A system according to claim 1, wherein the stack holding system (2) is stackable.

8. A system according to claim 1, further comprising at least one transport cart (28) configured to transport the stack holding system (2) from and into the treatment vessel (14).

9. A system according to any claim 1, wherein the frame (6) comprises an upper frame element (22) and is configured to support at least a second wood stack (34), wherein the second wood stack (34) is supported by an upper side of the upper frame element (22).

10. A system according to claim 9, wherein the system (30) comprises a third element (36) positioned on the side of the second wood stack (34) that is opposite the side of the second wood stack (34) supported by the frame (6), wherein the third element (36) is configured to exert a downwardly directed force.

11. A system according to claim 1, wherein the second element (10) or both the first element (8) and the second element (10) comprise one or more compression springs.

12. The system according to claim 1, wherein the second element comprises one or more compression springs configured to exert an adaptable substantially upwardly directed force on a lower side of the at least one wood stack.

* * * * *